(12) United States Patent
Alameh et al.

(10) Patent No.: US 8,391,719 B2
(45) Date of Patent: Mar. 5, 2013

(54) METHOD AND SYSTEM FOR CONDUCTING COMMUNICATION BETWEEN MOBILE DEVICES

(75) Inventors: Rachid Alameh, Crystal Lake, IL (US); William S. Hede, Lake in the Hills, IL (US); Louis J. Vannatta, Crystal Lake, IL (US); Michael W. Schellinger, Arlington Heights, IL (US); Kenneth A. Paitl, West Dundee, IL (US)

(73) Assignee: Motorola Mobility LLC, Libertyville, IL (US)

( * ) Notice: Subject to any disclaimer, the term of this patent is extended or adjusted under 35 U.S.C. 154(b) by 530 days.

(21) Appl. No.: 12/645,244

(22) Filed: Dec. 22, 2009

(65) Prior Publication Data

US 2010/0297946 A1  Nov. 25, 2010

Related U.S. Application Data

(63) Continuation-in-part of application No. 12/471,062, filed on May 22, 2009, now Pat. No. 8,304,733.

(51) Int. Cl.
*H04B 10/00* (2006.01)
(52) U.S. Cl. ....... 398/118; 398/115; 398/156; 455/41.3; 455/151.2
(58) Field of Classification Search .................. 398/115, 398/118, 116, 121, 127, 128, 130, 132, 133, 398/135, 138, 140, 156, 169, 170; 455/3.01, 455/3.05, 3.06, 426.1, 41.2, 41.3, 73, 74.1, 455/553.1, 556.1, 556.2, 151.2
See application file for complete search history.

(56) References Cited

U.S. PATENT DOCUMENTS

| | | | |
|---|---|---|---|
| 4,286,289 | A | 8/1981 | Ottensen et al. |
| 4,806,709 | A | 2/1989 | Evans |
| 4,914,624 | A | 4/1990 | Dunthorn |
| 4,967,083 | A | 10/1990 | Kornbrekke et al. |
| 5,179,369 | A | 1/1993 | Person et al. |
| 5,414,413 | A | 5/1995 | Tamaru et al. |
| 5,684,294 | A | 11/1997 | Kouhi |

(Continued)

FOREIGN PATENT DOCUMENTS

| EP | 1445922 A1 | 8/2004 |
|---|---|---|
| EP | 1553427 A1 | 7/2005 |

(Continued)

OTHER PUBLICATIONS

United States Patent and Trademark Office, "Non-Final Rejection" for U.S. Appl. No. 12/471,062, Oct. 4, 2011, 17 pages.

(Continued)

*Primary Examiner* — M. R. Sedighian
(74) *Attorney, Agent, or Firm* — Whyte Hirschboeck Dudek S.C.; Sylvia Chen

(57) ABSTRACT

Methods and systems for conducting communication between mobile devices are disclosed herein. In one embodiment, a method of achieving communications between first and second mobile devices that are in proximity with one another includes transmitting a first signal from the first mobile device and receiving a first reflected signal at that mobile device, the first reflected signal being the first signal reflected by an object in proximity to that mobile device. The method also includes transmitting a second signal from the first mobile device for receipt by the second mobile device upon being reflected by the object, and receiving a confirmation signal from the second mobile device in response to the second signal. The method further includes achieving a paired relationship of the first mobile device relative to the second mobile device, whereby because of the paired relationship the first and second mobile devices are capable of additional communications therebetween.

17 Claims, 6 Drawing Sheets

U.S. PATENT DOCUMENTS

| | | |
|---|---|---|
| 5,781,662 A | 7/1998 | Mori et al. |
| 5,793,486 A | 8/1998 | Gordon et al. |
| 5,821,521 A | 10/1998 | Bridgelall et al. |
| 5,945,988 A | 8/1999 | Williams et al. |
| 6,002,427 A | 12/1999 | Kipust |
| 6,107,994 A | 8/2000 | Harada et al. |
| 6,147,677 A | 11/2000 | Escobosa et al. |
| 6,184,538 B1 | 2/2001 | Bandara et al. |
| 6,185,950 B1 | 2/2001 | Baruschke et al. |
| 6,215,116 B1 | 4/2001 | Van Marcke |
| 6,246,407 B1 | 6/2001 | Wilks et al. |
| 6,246,862 B1 | 6/2001 | Grivas et al. |
| 6,292,674 B1 | 9/2001 | Davis |
| 6,330,457 B1 | 12/2001 | Yoon |
| 6,438,752 B1 | 8/2002 | McClard |
| 6,460,183 B1 | 10/2002 | Van Der Vleuten |
| 6,517,257 B2 | 2/2003 | Nishikawa et al. |
| 6,525,854 B1 | 2/2003 | Takahashi et al. |
| 6,666,081 B1 | 12/2003 | Babinsky et al. |
| 6,681,056 B1 | 1/2004 | Tseng et al. |
| 6,721,954 B1 | 4/2004 | Nickum |
| 6,804,012 B2 | 10/2004 | Gombert |
| 6,816,154 B2 | 11/2004 | Wong et al. |
| 6,925,413 B2 | 8/2005 | Krieg et al. |
| 6,933,922 B2 | 8/2005 | Casebolt et al. |
| 6,941,161 B1 | 9/2005 | Bobisuthi et al. |
| 7,012,637 B1 | 3/2006 | Blume et al. |
| 7,046,230 B2 | 5/2006 | Zadesky et al. |
| 7,134,092 B2 | 11/2006 | Fung et al. |
| 7,166,966 B2 | 1/2007 | Naugler, Jr. et al. |
| 7,212,835 B2 | 5/2007 | Mantyjarvi et al. |
| 7,220,958 B2 | 5/2007 | Kitamura et al. |
| 7,224,382 B2 | 5/2007 | Baker |
| 7,237,929 B2 | 7/2007 | Stahl |
| 7,324,671 B2 | 1/2008 | Li et al. |
| 7,339,580 B2 | 3/2008 | Westerman et al. |
| 7,340,077 B2 | 3/2008 | Gorturk et al. |
| 7,368,703 B2 | 5/2008 | De Samber et al. |
| 7,380,716 B2 | 6/2008 | Yokoyama |
| 7,468,689 B2 | 12/2008 | Ma et al. |
| 7,486,386 B1 | 2/2009 | Holcombe et al. |
| 7,489,297 B2 | 2/2009 | Hohmann et al. |
| 7,515,177 B2 | 4/2009 | Yoshikawa |
| 7,519,918 B2 | 4/2009 | Trantow |
| 7,532,196 B2 | 5/2009 | Hinckley |
| 7,534,988 B2 | 5/2009 | Kong et al. |
| 7,557,965 B2 | 7/2009 | Taylor et al. |
| 7,561,146 B1 | 7/2009 | Hotelling |
| 7,630,716 B2 | 12/2009 | Tamura et al. |
| 7,687,774 B2 | 3/2010 | Ohta et al. |
| 7,688,283 B2 | 3/2010 | Jung et al. |
| 7,715,723 B2 * | 5/2010 | Kagawa et al. ............... 398/131 |
| 7,721,310 B2 | 5/2010 | Schaffer et al. |
| 7,728,958 B2 | 6/2010 | Pfaff |
| 7,795,584 B2 | 9/2010 | Mok et al. |
| 7,814,791 B2 | 10/2010 | Andersson et al. |
| 7,855,716 B2 | 12/2010 | McCreary et al. |
| 7,912,376 B2 | 3/2011 | Rollins |
| 7,967,451 B2 | 6/2011 | Chen et al. |
| 7,971,156 B2 | 6/2011 | Albertson et al. |
| 7,991,575 B2 | 8/2011 | Vogel et al. |
| 7,991,896 B2 | 8/2011 | Shen et al. |
| 8,006,002 B2 | 8/2011 | Kalayjian et al. |
| 8,013,904 B2 | 9/2011 | Tan et al. |
| 8,018,501 B2 | 9/2011 | Sasaki |
| 8,023,061 B2 | 9/2011 | Ra |
| 8,072,469 B2 | 12/2011 | Ottney |
| 8,104,113 B2 | 1/2012 | Rodenbeck et al. |
| 2001/0019338 A1 | 9/2001 | Roth |
| 2002/0104081 A1 | 8/2002 | Candelore et al. |
| 2002/0122072 A1 | 9/2002 | Selker |
| 2002/0199186 A1 | 12/2002 | Ali et al. |
| 2003/0063128 A1 | 4/2003 | Salmimaa et al. |
| 2003/0222917 A1 | 12/2003 | Trantow |
| 2004/0207997 A1 | 10/2004 | Stewart et al. |
| 2005/0104860 A1 | 5/2005 | McCreary et al. |
| 2005/0150697 A1 | 7/2005 | Altman et al. |
| 2005/0198029 A1 | 9/2005 | Pohja et al. |
| 2005/0232447 A1 | 10/2005 | Shinozuka et al. |
| 2005/0289182 A1 | 12/2005 | Pandian et al. |
| 2006/0010400 A1 | 1/2006 | Dehlin et al. |
| 2006/0028453 A1 | 2/2006 | Kawabe |
| 2006/0031786 A1 | 2/2006 | Hillis et al. |
| 2006/0059152 A1 | 3/2006 | Nakamura |
| 2006/0067573 A1 | 3/2006 | Parr et al. |
| 2006/0125799 A1 | 6/2006 | Hillis et al. |
| 2006/0132456 A1 | 6/2006 | Anson |
| 2006/0161870 A1 | 7/2006 | Hotelling et al. |
| 2006/0161871 A1 | 7/2006 | Hotelling et al. |
| 2006/0256074 A1 | 11/2006 | Krum et al. |
| 2007/0058255 A1 | 3/2007 | Imai et al. |
| 2007/0109266 A1 | 5/2007 | Davis et al. |
| 2007/0137462 A1 | 6/2007 | Barros et al. |
| 2007/0177803 A1 | 8/2007 | Elias et al. |
| 2007/0180392 A1 | 8/2007 | Russo |
| 2007/0220437 A1 | 9/2007 | Boillot |
| 2007/0247643 A1 | 10/2007 | Nakamura et al. |
| 2008/0005703 A1 | 1/2008 | Radivojevic et al. |
| 2008/0006762 A1 | 1/2008 | Fadell et al. |
| 2008/0024454 A1 | 1/2008 | Everest |
| 2008/0052643 A1 | 2/2008 | Ike et al. |
| 2008/0079902 A1 | 4/2008 | Mandelstam-Manor et al. |
| 2008/0100928 A1 | 5/2008 | Wilson |
| 2008/0122803 A1 | 5/2008 | Izadi et al. |
| 2008/0129688 A1 | 6/2008 | Richardson et al. |
| 2008/0161870 A1 | 7/2008 | Gunderson |
| 2008/0165140 A1 | 7/2008 | Christie et al. |
| 2008/0192005 A1 | 8/2008 | Elgoyhen et al. |
| 2008/0195735 A1 | 8/2008 | Hodges et al. |
| 2008/0204427 A1 | 8/2008 | Heesemans et al. |
| 2008/0211771 A1 | 9/2008 | Richardson |
| 2008/0219672 A1 | 9/2008 | Tam et al. |
| 2008/0225041 A1 | 9/2008 | El Dokor et al. |
| 2008/0240568 A1 | 10/2008 | Tonouchi |
| 2008/0252595 A1 | 10/2008 | Boillot |
| 2008/0256494 A1 | 10/2008 | Greenfield |
| 2008/0266083 A1 | 10/2008 | Midholt et al. |
| 2008/0280642 A1 | 11/2008 | Coxhill et al. |
| 2008/0284738 A1 | 11/2008 | Hovden et al. |
| 2008/0297487 A1 | 12/2008 | Hotelling et al. |
| 2008/0303681 A1 | 12/2008 | Hertz et al. |
| 2008/0309641 A1 | 12/2008 | Harel et al. |
| 2009/0021488 A1 | 1/2009 | Kali et al. |
| 2009/0031258 A1 | 1/2009 | Arrasvouri et al. |
| 2009/0061823 A1 | 3/2009 | Chu |
| 2009/0092284 A1 | 4/2009 | Breed et al. |
| 2009/0158203 A1 | 6/2009 | Kerr et al. |
| 2009/0277697 A1 | 11/2009 | Bolt et al. |
| 2009/0299633 A1 | 12/2009 | Hawes et al. |
| 2009/0303176 A1 | 12/2009 | Chen et al. |
| 2011/0009194 A1 | 1/2011 | Gabai et al. |
| 2012/0046906 A1 | 2/2012 | Alameh et al. |

FOREIGN PATENT DOCUMENTS

| | | |
|---|---|---|
| EP | 1657819 A2 | 5/2006 |
| EP | 1760573 A2 | 3/2007 |
| EP | 2000896 A2 | 12/2008 |
| EP | 2037349 A2 | 3/2009 |
| JP | 02280427 A | 11/1990 |
| JP | 2005293419 A | 10/2005 |
| JP | 2006010489 A | 1/2006 |
| JP | 2007042020 A | 2/2007 |
| JP | 2009085799 A | 4/2009 |
| KR | 1020030044749 A | 6/2003 |
| KR | 1020050100642 A | 10/2005 |
| WO | 9528777 A1 | 10/1995 |
| WO | 0241129 A2 | 5/2002 |
| WO | 03023701 A2 | 3/2003 |
| WO | 03076870 A1 | 9/2003 |
| WO | 2005076542 A1 | 8/2005 |
| WO | WO 2005/076542 A1 * | 8/2005 |
| WO | 2005101176 A2 | 10/2005 |
| WO | 2008016394 A2 | 2/2008 |
| WO | 2008073289 A3 | 6/2008 |

OTHER PUBLICATIONS

United States Patent and Trademark Office, "Non-Final Rejection" for U.S. Appl. No. 12/428,187, Oct. 26, 2011, 27 pages.
United States Patent and Trademark Office, "Non-Final Rejection" for U.S. Appl. No. 12/640,887, Sep. 30, 2011, 11 pages.
U.S. Patent and Trademark Office, "Notice of Allowance" for U.S. Appl. No. 12/344,760, Jan. 3, 2011, 9 pages.
Patent Cooperation Treaty, "PCT Search Report and Written Opinion of the International Searching Authority" for International Application No. PCT/US2010/030964, Nov. 9, 2010, 24 pages.
Patent Cooperation Treaty, "PCT Search Report and Written Opinion of the International Searching Authority" for International Application No. PCT/US2010/033472, Dec. 15, 2010, 9 pages.
United States Patent and Trademark Office, "Non-Final Office Action" for U.S. Appl. No. 12/347,146, Jul. 18, 2011, 9 pages.
United States Patent and Trademark Office, "Non-Final Office Action" for U.S. Appl. No. 12/428,260, Oct. 5, 2011, 10 pages.
Patent Cooperation Treaty, "Notification of Transmittal of the International Search Report and the Written Opinion of the International Searching Authority, or the Declaration" for PCT/US2010/039561, Sep. 30, 2010, pp. 1-13.
Patent Cooperation Treaty, "Notification of Transmittal of the International Search Report and the Written Opinion of the International Searching Authority, or the Declaration" for PCT/US2010/028654, Dec. 1, 2010, pp. 1-22.
United States Patent and Trademark Offce, "Non-Final Rejection" for U.S. Appl. No. 12/500,625, Dec. 29, 2011, 30 pages.
United States Patent and Trademark Office, "Final Rejection" for U.S. Appl. No. 12/428,187, Apr. 10, 2012, 10 pages.
United States Patent and Trademark Office, "Final Rejection" for U.S. Appl. No. 12/428,286, Mar. 14, 2012, 9 pages.
United States Patent and Trademark Office, "Non-Final Rejection" for U.S. Appl. No. 12/646,199, Mar. 7, 2012, 17 pages.
United States Patent and Trademark Office, "Final Rejection" for U.S. Appl. No. 12/471,062, Feb. 22, 2012, 15 pages.
United States Patent and Trademark Office, "Non-Final Rejection" for U.S. Appl. No. 12/646,601, Feb. 14, 2012, 9 pages.
Jungsoo Kim et al., "The Gesture Watch: A Wireless Contact-free Gesture based Wrist Interface", 11th IEEE Int'l Symp. on Wearable Computers, 2007, pp. 15-22.
Thad Starner et al., "The Gesture Pendant: A Self-Illuminating, Wearable, Infared Computer Vision System for Home Automation Control and Medical Monitoring", 4th IEEE Int'l Symp. on Wearable Computers, 2000, pp. 87-94.
Heinrich Ruser, "Object recognition with a smart low-cost active infared sensor array", 1st Int'l Conf. on Sensing Tech., Nov. 21-23, 2005, pp. 494-499.
United States Patent and Trademark Office, "Final Rejection" for U.S. Appl. No. 12/640,867, Mar. 30, 2012, 11 pages.
United States Patent and Trademark Office, "Non-Final Rejection" for U.S. Appl. No. 12/648,503, Feb. 17, 2012, 7 pages.
United States Patent and Trademark Office, "Notice of Allowance" for U.S. Appl. No. 13/283,984, Dec. 21, 2011, 9 pages.
Patent Cooperation Treaty, "PCT Search Report and Written Opinion of the International Searching Authority" for International Application No. PCT/US2010/061254, Apr. 7, 2011, 16 pages.
Patent Cooperation Treaty, "PCT Search Report and Written Opinion of the International Searching Authority" for International Application No. PCT/US2010/061261, Mar. 17, 2011, 14 pages.
United States Patent and Trademark Office, "Non-Final Rejection" for U.S. Appl. No. 12/471,062, Apr. 25, 2011, 16 pages.
Vladislav Pavlov et al., "Model-based object characterization with active infrared sensor array," IEEE Sensors Conference, 2007, pp. 360-363.
Henrik V. Christensen, "Retrieval of 3D-position of a Passive Object using Infrared LED's and Photodiodes," International Conference on Acoustics, Speech, and Signal Processing (ICASSP), 2005, pp. IV 1093-96.
Patent Cooperation Treaty, "PCT Search Report and Written Opinion of the International Searching Authority" for International Application No. PCT/US2009/066555, Jul. 16, 2010, 11 pages.

U.S. Appl. No. 12/428,187, filed Apr. 22, 2009 "Menu Configuration System and Method for Display on an Electronic Device".
U.S. Appl. No. 12/428,266, filed Apr. 22, 2009 "Touch-Screen and Method for an Electronic Device".
U.S. Appl. No. 12/500,625, filed Jul. 10, 2009 "Devices and Methods for Adjusting Proximity Detectors".
Specification of the Bluetooth System; Master Table of Contents & Compliance Requirements; Covered Core Package V. 3.0 +HS; Apr. 21, 2009; 192 pages.
G.Yun and M.Kavehrad, "Spot diffusing and fly-eye receivers for indoor infrared wireless communications", Proc. 1992 IEEE, Conf. Sel, Topics in Wireless Comm., Vancouver, BC, Canada, Jun. 25-26, 1992, pp. 286-292.
Kahn, J.M., You, R., Djahani, P., Weisbin, A.G."Imaging Diversity Receivers for high-speed infrared wireless communication", IEEE Communications Mag., Dec. 1998, Accessed May 7, 2009; 7 pages.
Ward, A.; Jones A.; Hopper A.; "A new location technique for the active office"; IEEE Personal Communications, 1997; accessed May 7, 2009; 11 pages.
Metzger, C.; Anderson, M.; Starner, T.; "FreeDigiter: A contact-free device for gesture control"; Wearable Computers 2004; ISWC 2004, 8th International Symposium, vol. 1, Oct. 31/Oct. 4, 2004, pp. 18-21.
Von Hardenberg, C.; Berard F.; "Bare-hand human-computer interaction" PUI; ACM 1-58113-448-7 Nov. 14, 2001; Orlando, FL, USA; 8 pages.
TrackIR; Vector Expansion; True 6DOF view control offer 3-dimensional virtual reality via motion control; TRACKIR by NaturalPoint; www.naturalpoint.com, 2 pages Aug. 2005.
Bricklin, D.; Gestures, the iPhone, and Standards: A Developer's Questions, www.bricklin.com, 10 pages, 1999-2009.
Gearlog, Microsoft's sidesight: something Apple show watch, www.gearlog.com; 5 pages, 1996-2008, Ziff Davis Publ. Holdings, Inc.
Hadamard transform—Wikipedia definition; http://en.wikipedia.org/wiki/Hadamard_transform; 4 pages, Oct. 2009.
Silicon Laboratories, Inc.; Si1120 Evaluation Kit User's Guide, Austin, TX, Dec. 2009, 10 pages; www.silabs.com/support/pages/contacttechnicalsupport.aspx.
U.S. Appl. No. 12/643,211, filed Dec. 21, 2009; "Electronic device with sensing assembly and method for interpreting consecutive gestures."
U.S. Appl. No. 12/640,867, filed Dec. 17, 2009, "Electronic device with sensing assembly and method for detecting basic gestures."
U.S. Appl. No. 12/646,601, filed Dec. 23, 2009, "Electronic device with sensing assembly and method for detecting gestures of geometric shapes."
U.S. Appl. No. 12/648,503, filed Dec. 29, 2009, "Electronic device with sensing assembly and method for interpreting offset gestures."
U.S. Appl. No. 12/641,830, filed Dec. 18, 2009, "Mobile device with user interaction capability and method of operating same".
U.S. Appl. No. 12/471,062, filed May 22, 2009, "Sensing assembly for mobile device."
U.S. Appl. No. 12/648,199, filed Dec. 23, 2009, "Method and system for controlling data transmission to or from a mobile device."
U.S. Appl. No. 12/344,760, filed Dec. 29, 2008, "Portable electronic device having self-calibrating proximity sensors."
U.S. Appl. No. 12/347,146, filed Dec. 31, 2008, "Portable electronic device having directional proximity sensors based on device orientation."
United States Patent and Trademark Office, "Non-Final Rejection" for U.S. Appl. No. 12/643,211, Sep. 17, 2012, 8 pages.
United States Patent and Trademark Office, "Non-Final Rejection" for U.S. Appl. No. 12/641,830, Sep. 20, 2012, 8 pages.
United States Patent and Trademark Office, "Final Rejection" for U.S. Appl. No. 12/646,199, Sep. 17, 2012, 21 pages.
Michael McKenna, "Interactive Viewpoint Control and Three-Dimensional Operations" Proceedngs of the 1992 Symposium on Interactive 3D Graphics, 1992, pp. 53-56.

* cited by examiner

METHOD AND SYSTEM FOR CONDUCTING COMMUNICATION BETWEEN MOBILE DEVICES

CROSS-REFERENCE TO RELATED APPLICATIONS

This application is a continuation-in-part of and claims the benefit of U.S. patent application Ser. No. 12/471,062, titled "Sensing Assembly For Mobile Device" and filed on May 22, 2009 now U.S. Pat. No. 8,304,733, which is hereby incorporated by reference herein.

FIELD

The present invention relates generally to mobile devices and, more particularly, to methods and systems that facilitate communications between multiple mobile devices.

BACKGROUND

Mobile devices such as cellular telephones, smart phones, and other handheld or portable electronic devices such as personal digital assistants (PDAs), headsets, MP3 players, etc. have become popular and ubiquitous. Such mobile devices are being increasingly used to hold and process large amounts of data, including word processing files, photos, MP3 files, etc. Given the large amounts of data that can be stored and processed by mobile devices, it is also of increasing interest that mobile devices be capable of easily and effectively communicating with other mobile devices so as to allow for rapid and effective (and controlled) transfer of data between mobile devices.

A variety of communication methodologies and protocols are already widely available for enabling communications between multiple mobile devices. Some of these methodologies and protocols allow for users to simply, by way of issuing a simple command (or even simply positioning a given mobile device into proximity with another mobile device), cause specific communications linkages to arise between specific mobile devices. The establishment of such communications linkages between specific groups of two or more mobile devices, which can also be referred to as "pairing", is found for example in the context of Bluetooth-enabled mobile devices. Pairing among such mobile devices can be achieved when one or more users perform actions on a keypad or with a navigation button on at least one of the mobile devices. Once the pairing has been achieved, a variety of types of data can then be transferred between the paired devices.

Bluetooth-enabled mobile devices can be configured for automatic pairing with other Bluetooth-enabled mobile devices. Automatic pairing (in at least some circumstances) can occur between any two (or more) such mobile devices that happen to be within range of one another, without discrimination based upon the mobile device. Consequently, in at least some such circumstances, data available for transfer by a given mobile device may not be sufficiently secure, insofar as there is no guarantee that the other device with which the given mobile device has been paired is in fact a device with which the data should be shared. Alternatively, in lieu of such automatic pairing, pairing between Bluetooth-enabled mobile devices can be achieved by way of manual commands. However, while manually-achieved pairing of Bluetooth-enabled mobile devices improves the likelihood that any paired device to which another device wishes to transmit data is an appropriate device for receiving that data, the providing of manual commands from a human operator can be onerous and inconvenient, as it can require navigation through menu structures and the pressing of one or more buttons on one or more mobile devices.

Therefore, for the above reasons, there is an opportunity to develop a new method and/or system for enabling two or more mobile devices to transfer data.

BRIEF DESCRIPTION OF THE DRAWINGS

Embodiments of the invention are disclosed with reference to the accompanying drawings and are for illustrative purposes only. The system and method are not limited in their application to the details of construction or the arrangement of the components illustrated in the drawings. The invention is capable of other embodiments or of being practiced or carried out in other various ways. The drawings illustrate a best mode presently contemplated for carrying out the invention. In the drawings.

DETAILED DESCRIPTION

Figure 1:
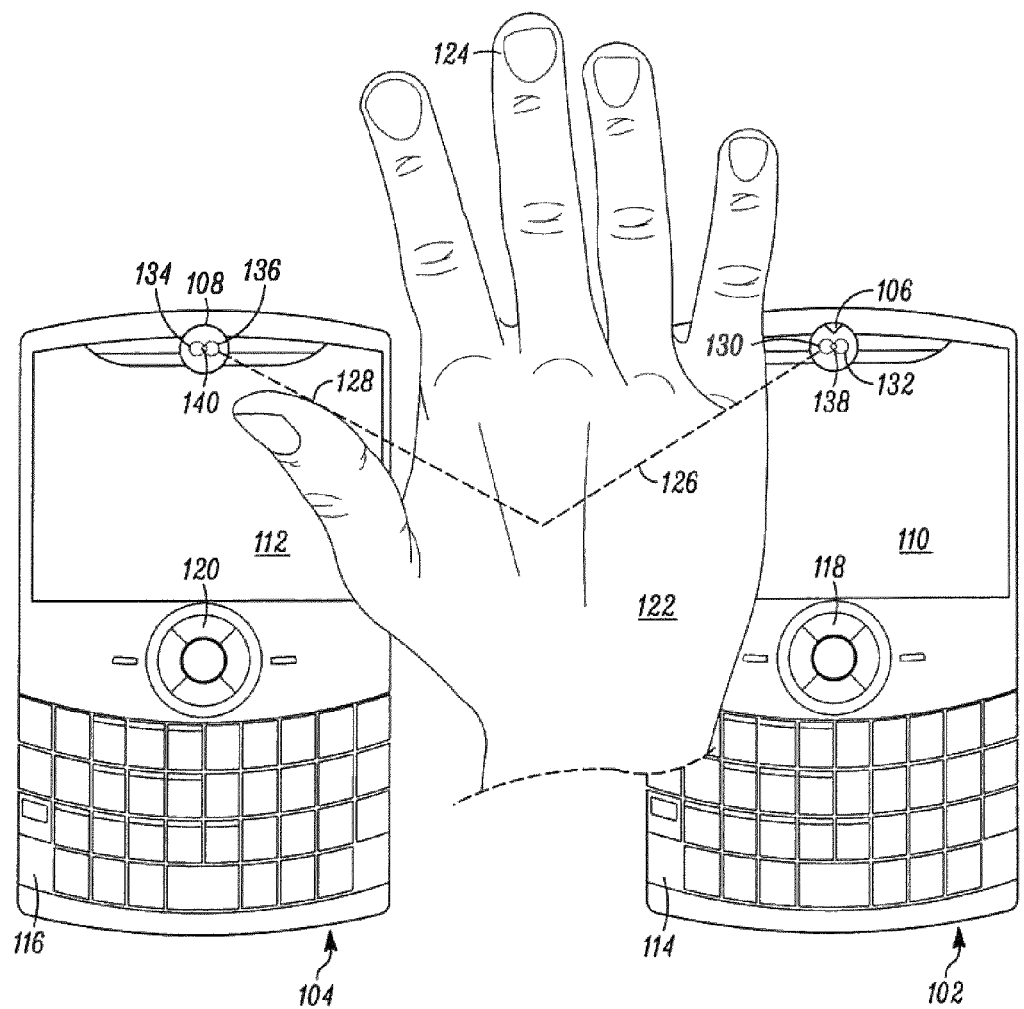
FIG. 1 is a front elevation view of first and second mobile devices that each employ an infrared light transmitter and receiver capable of sensing an external object, and sending and receiving data files therebetween, in accordance with the present embodiment.

Systems and methods for pairing mobile devices are described herein. In at least some embodiments, the system and method allows for the pairing of mobile devices and transferring of files therebetween when the mobile devices are positioned adjacent to each other as shown in FIG. 1 and an object such as a hand passes or swipes over the devices as shown in FIGS. 4-7. The object serves to at least temporarily provide a reflective surface for infrared signals to be transmitted from one mobile device and received by the same and/or another mobile device. Also in at least some embodiments, the system and method includes at least one mobile device that is capable of sensing one or more object portions, such as fingers. The object portions are passed over a sensor in a mobile device and each object portion passes through a signal beam transmitted by the mobile device and separately reflects that signal back to the mobile device. The number of object portions counted by the mobile device can be interpreted in various manners, such as to indicate a number of files to be transferred by that mobile device to another mobile device with which it is paired, or to activate one or more functions in the mobile device, such as a menu shortcut or a speed-dial function.

In one example embodiment, the system includes a first infrared transmitter capable of sending first and second transmitted signals outward away from the first mobile device, and a first infrared receiver capable of receiving a first reflected signal, the first reflected signal being the first transmitted signal after the first transmitted signal is reflected off of an object and indicating proximity of the object to the first mobile device. The second transmitted signal is a handshake/pairing code and/or data stream. In at least some embodiments, the first and second mobile devices can utilize orthogonal coding, which allows for all signals (e.g., proximity detection, pairing/handshake, and/or file transfer signals from either device) to happen at the same time (e.g., full duplex instead of simplex communication). Thus, while in some embodiments multiple signals of various types (such as the aforementioned first and second transmitted signals) are sent in serial fashion, in other embodiments multiple signals of various types can be sent or received to or from the different devices simultaneously or substantially simultaneously.

The system also includes a first processing device coupled to the infrared transmitter and infrared receiver and configured to determine when an object is present in proximity to the first mobile device. In at least some cases, the processing device causes the first infrared transmitter to send the second transmitted signal upon determining that the object is nearby the first mobile device based upon the first reflected signal, and the second transmitted signal is configured to enable a paired relationship between the first and second mobile devices, whereby (because of the paired relationship) the first and second mobile devices are capable of additional communications therebetween. Additionally, another example provides a first mobile device for achieving communications with a second mobile device that is in proximity with the first mobile device. The first mobile device includes an infrared transmitter capable of transmitting first and second signals from the first mobile device, and an infrared receiver capable of receiving a first reflected signal, the first reflected signal being the first signal reflected by an object. The first mobile device additionally includes a processor coupled to the infrared transmitter and the infrared receiver and configured to determine, based upon the first reflected signal, if the object is in proximity to the first mobile device. The processor causes the infrared transmitter to transmit a second signal upon determining that the object is present in proximity to the first mobile device, where the second signal is configured to enable a paired relationship to be established between the first and second mobile devices, whereby the first and second mobile devices are capable of additional communications therebetween because of the paired relationship.

Further, another embodiment provides a second mobile device for achieving communications with a first mobile device that is in proximity with the second mobile device. The second mobile device includes an infrared transmitter capable of sending first and second signals from the second mobile device, and an infrared receiver capable of receiving a first reflected signal, the first reflected signal being the first signal reflected by an object. The second mobile device also includes a processor coupled to the infrared transmitter and the infrared receiver and configured to determine, based upon the first reflected signal, if the object is in proximity to the second mobile device. The infrared receiver is enabled to receive an additional signal originating from the first mobile device upon determining that the object is present in proximity to the second mobile device. The processor, upon receiving the additional signal, causes the infrared transmitter to transmit the second signal for receipt by the first mobile device, the second signal confirming an acceptance by the second mobile device of a pairing offer represented by the additional signal, whereby a paired relationship between the second and first mobile devices is established and the first and second mobile devices are capable of additional communications therebetween because of the paired relationship.

Yet another example provides a method of achieving communications between first and second mobile devices that are in proximity with one another. The method includes (a) positioning at least one of mobile devices so that the first and second mobile devices are in proximity with one another, and (b) moving an object over the first mobile device so as to reflect a first transmitted signal sent outward by the first mobile device back to a first receiver on the first mobile device, whereby the first mobile device is thereby able to detect a presence of the object. The method also includes (c) continuing the moving of the object toward the second mobile device so as to reflect a second transmitted signal sent outward by the second mobile device to a second receiver on the second mobile device, whereby the second receiver is able to detect the presence of the object, and (d) further reflecting a third transmitted signal sent outward by the first mobile device for receipt by the second receiver, whereby information concerning a pairing of the first and second mobile devices can be evaluated by the second mobile device. The method additionally includes (e) further operating the first and second mobile devices after the pairing of the mobile devices has been completed.

FIG. 1 shows first and second mobile devices 102, 104 that include, among their various components, first and second sensing assemblies 106, 108, in accordance with one embodiment. In the present example shown, the mobile devices 102, 104 are dual-mode cellular—WPAN (Wireless Personal Area Network) mobile telephones, albeit the mobile devices are also intended to be representative of a variety of other types of mobile devices that can be employed in other embodiments including, for example, PDAs, smart phones, other handheld or portable electronic devices such as notebook or laptop computing devices, headsets, MP3 players and other portable video and audio players, geopositioning and navigation devices, gaming consoles, and even other devices, including a wide variety of devices that can utilize or benefit from pairing and file transfer with a mobile device (e.g., televisions, kiosks, ATMs, vending machines, automobiles, etc.).

Included among the components of the respective mobile devices 102 and 104, as shown in FIG. 1, are respective video screens 110 and 112, respective keypads 114 and 116 each having numerous keys and respective navigation clusters (in this case, "five-way navigation key clusters") 118 and 120. Depending upon the embodiment, the mobile devices can include other components as well. It will further be understood that the two mobile devices 102, 104 need not be, and often are not, identical to one another in their features or components. Additionally FIG. 1 also shows an exemplary object that is being swiped over the mobile devices 102, 104. In the present embodiment, the object more specifically is a hand 122 with fingers 124, which can more generally be considered as constituting object portions. Although FIG. 1 shows the hand 122 with the fingers 124 as being the object with object portions, it should be understood that in other embodiments other objects and/or object portions can take the place of the hand/fingers.

As will be described in further detail below, the sensing assemblies 106, 108 in the present embodiment operate as short-range wireless transceivers, and to some extent also operate as proximity sensors. When operated as proximity sensors, the sensing assemblies 106, 108 are used to detect the presence of the hand 122 and/or fingers 124 being swiped over the mobile device 102. When operated as wireless transceivers, the sensing assemblies 106, 108 are used to pair, or establish a communication path between, the mobile devices 102, 104. Further, in some cases the sensing assemblies 106, 108 when operated as wireless transceivers are also used to transmit data between the mobile devices 102, 104 after the devices have been paired. Although various types of components can be employed as the sensing assemblies 106, 108, in this embodiment both of the sensing assemblies 106, 108 are pyramid-type sensing assemblies as disclosed in pending U.S. patent application Ser. No. 12/471,062 entitled "Sensing Assembly for Mobile Device" and filed on May 22, 2009, which is hereby incorporated by reference herein. As described therein, some pyramid-type sensing assemblies provide a single sensing assembly with a plurality of phototransmitters (such as photodiodes) in combination with one or more photoreceivers, or alternatively a plurality of photoreceivers in combination with one or more phototransmitters.

In the present embodiment, the sensing assemblies 106, 108 operate by transmitting and/or receiving one or more (typically multiple) infrared signals using preferably Time Division Multiplexing transmission. Other schemes such as wavelength division multiplexing, code multiplexing, and infrared modulation can be used as well. Transmitted infrared signals such as an exemplary transmitted signal 126 shown in FIG. 1 are generated by one or more infrared phototransmitters (e.g., photo-light emitting diodes (photo-LEDs)). More particularly, the phototransmitters can, but need not, be near-infrared photo-LEDs transmitting light having wavelength(s) preferably in the range of approximately 850 to 890 nanometers, considered "near" infrared. Visible light LEDs at lower wavelengths can be used as well. Assuming the presence of an object such as the hand 122 situated at least partially above one or both of the sensing assemblies 106, 108, portions of the transmitted infrared signals can be reflected by the hand (or other object or portion(s) thereof), so as to constitute one or more reflected infrared signals, one of which is shown as an exemplary reflected signal 128. The reflected infrared signals are sensed by one or more infrared light sensing devices or photoreceivers (e.g., photodiodes and phototransistors) of the second sensing assembly 108, which more particularly can (but need not) be suited for receiving near-infrared light having wavelength(s) in the aforementioned range.

Still referring to FIG. 1, the first sensing assembly 106 located in the first mobile device 102 includes a first phototransmitter 130 and a first photoreceiver 132. A multiple diode assembly, such as the above-mentioned pyramid-type sensing assembly, can (in addition to simple object detection) be also used to enable directional tracking of object movement. The second sensing assembly 108 located in the second mobile device 104 particularly includes a second phototransmitter 134 and a second photoreceiver 136. The phototransmitters 130, 134 are co-located with their respective photoreceivers 132, 136, although this not need be the case, as one or more phototransmitters and photoreceivers can be included and located in various positions about the mobile devices 102, 104. In the present embodiment, the sensing assemblies 106, 108 each have a central axis 138, 140, respectively, that are perpendicular to the facial surfaces of the phototransmitters and photoreceivers, and substantially perpendicular to the surface of the video screens 110, 112. In other embodiments, the central axes 138, 140 can be positioned at various angles and intentional offsets with respect to the facial surfaces and video screens 110, 112.

Figure 2:
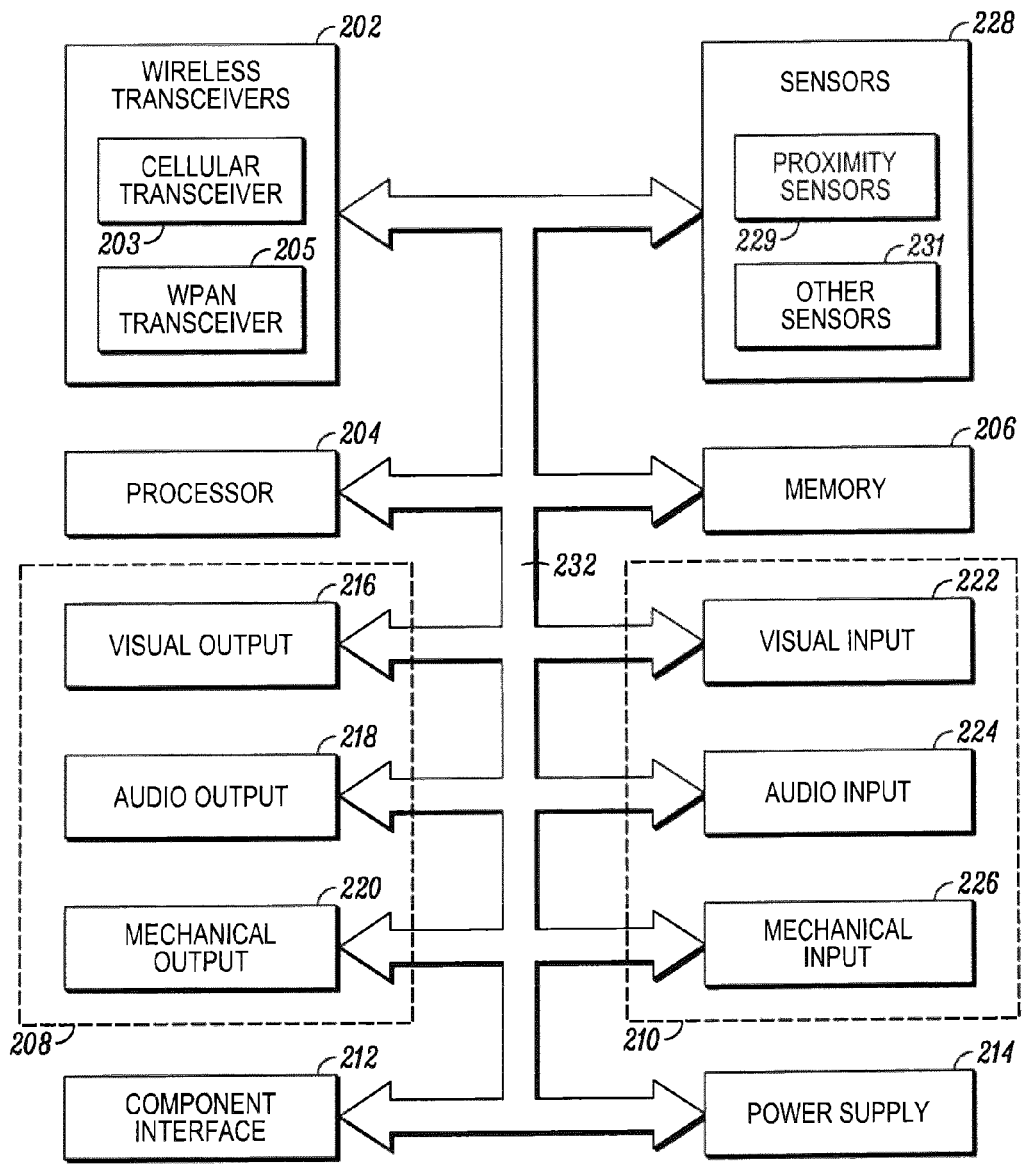
FIG. 2 is a block diagram illustrating exemplary components of each of the mobile devices of FIG. 1.

FIG. 2 provides a block diagram illustrating internal components 200 of a mobile device such as the mobile devices 102, 104, in accordance with the present embodiment. As described further below, some of the components 200 correspond to certain of the components of the mobile devices 102, 104 already described in relation to FIG. 1. As shown in FIG. 2, the components 200 include one or more wireless transceivers 202, 203, and 205, a processor 204 (e.g., a microprocessor, microcomputer, application-specific integrated circuit, etc.), a memory portion 206, one or more output components 208, and one or more input components 210. In at least some embodiments, a user interface is present that comprises one or more output components 208 and one or more input components 210. The internal components 200 can further include a component interface 212 to provide a direct connection to auxiliary components or accessories for additional or enhanced functionality. The internal components 200 preferably also include a power supply 214, such as a battery, for providing power to the other internal components while enabling the mobile device to be portable. All of the internal components 200 can be coupled to one another, and in communication with one another, by way of one or more internal communication links 232 (e.g., an internal bus).

Each of the wireless transceivers 202 utilizes a wireless technology for communication, such as, but not limited to, cellular-based communication technologies such as analog communications (using AMPS), digital communications (using CDMA, TDMA, GSM, iDEN, GPRS, EDGE, etc.), and next generation communications (using UMTS, WCDMA, LTE, IEEE 802.16, etc.) or variants thereof, or peer-to-peer or ad hoc communication technologies such as HomeRF (radio frequency), Bluetooth, and IEEE 802.11 (a, b, g or n), or other wireless communication technologies such as infrared technology. In the present embodiment, the wireless transceivers 202 include a cellular transceiver 203 and a WPAN transceiver 205, although other embodiments may have only one of these types of wireless transceivers (and possibly neither of these types of wireless transceivers, and/or other types of wireless transceivers). Depending upon the embodiment, the WPAN transceiver 205 can allow for wireless communications in accordance with any of a variety of WPAN protocols or formats, for example, Bluetooth or IrDA (Infrared Data Association) protocols or formats.

Exemplary operation of the wireless transceivers 202 in conjunction with others of the internal components 200 of the mobile devices 102, 104 can take a variety of forms and can include, for example, operation in which, upon reception of wireless signals, the internal components detect communication signals and the transceiver 202 demodulates the communication signals to recover incoming information, such as voice and/or data, transmitted by the wireless signals. After receiving the incoming information from the transceiver 202, the processor 204 formats the incoming information for the one or more output devices 208. Likewise, for transmission of wireless signals, the processor 204 formats outgoing information, which may or may not be activated by the input devices 210, and conveys the outgoing information to one or more of the wireless transceivers 202 for modulation to communication signals. The wireless transceiver(s) 202 convey the modulated signals to a remote device, such as another mobile device, a cell tower, access point, or a remote server (not shown).

Depending upon the embodiment, the input and output components 208, 210 can produce a variety of visual, audio, and/or mechanical outputs. For example, the output components 208 can include a visual output component 216 such as a liquid crystal display and light emitting diode indicator, an audio output component 218 can include a speaker, alarm, and/or buzzer, and a mechanical output component 220 can include a vibrating mechanism. The visual output devices 216 among other things can include the video screens 110, 112 of FIG. 1. Likewise, by example, the input components 210 can include a visual input component 222 such as an optical sensor (for example, a camera), an audio input component 224 can include a microphone, and a mechanical input component 226 can include a flip sensor, keyboard, keypad, selection button, touch pad, or touchscreen. The mechanical input component 226 can include, among other things, the keypads 114, 116 and the navigation clusters 118, 120 of FIG. 1. Actions that can actuate one or more input components 210 can include not only the physical pressing/actuation of buttons or other actuators, but can also include, for example, opening the mobile device, unlocking the device, moving the device to actuate a motion, moving the device to actuate a location positioning system, and operating the device.

With respect to the sensors 228, these can include various sensors depending upon the embodiment including, as shown, both proximity sensors 229 and other sensors 231. The proximity sensors 229 can include a sensor such as a light detecting sensor, an ultrasound transceiver, or an infrared transceiver, any one of which can operate by, for example, measuring the signal strength (amplitude) of a reflected signal (that is, a signal emitted by the sensor, reflected off of a target, and received back at the sensor) against a predetermined threshold. Thus, in the present embodiment, the sensing assemblies 106, 108 can be considered as constituting proximity sensors 229 of the mobile devices 102, 104 given that, as discussed further below, the sensing assemblies can operate so as to sense the presence of an object or object portions such as the hand 122 with the fingers 124 shown in FIG. 1. That said, the sensing assemblies 106, 108 can also be considered as constituting the WPAN transceivers 205 of the mobile devices 102, 104 to the extent that, as also described further below, those sensing assemblies of the different mobile devices employ infrared signals to allow for data communication between the mobile devices. As for the other sensors 231, these can include various types of sensors, such as touch sensors, altitude sensors, accelerometers, gyroscopes, or any other information collecting device that can identify a current location or user-device interface (carry mode) of the mobile device 102.

The memory portion 206 of the internal components 200 can encompass one or more memory devices of any of a variety of forms (e.g., read-only memory, random access memory, static random access memory, dynamic random access memory, etc.), and can be used by the processor 204 to store and retrieve data. The data that is stored by the memory portion 206 can include, but need not be limited to, operating systems, applications, and informational data. Each operating system includes executable code that controls basic functions of the communication device, such as interaction among the various components included among the internal components 200, communication with external devices via the wireless transceivers 202 and/or the component interface 212, and storage and retrieval of applications and data, to and from the memory portion 206. Each application includes executable code that utilizes an operating system to provide more specific functionality for the communication devices, such as file system service and handling of protected and unprotected data stored in the memory portion 206. Informational data is non-executable code or information that can be referenced and/or manipulated by an operating system or application for performing functions of the communication device.

Turning to FIGS. 3 and 4-7, FIG. 3 sets forth steps of an exemplary process of pairing the mobile devices 102, 104 and initiating the process for and/or transferring data, while FIGS. 4-7 illustrate the performing of certain of those steps by the mobile devices 102, 104 when interacting with the hand 122 and positioned as shown in FIG. 1. It will be noted that FIG. 3 groups the steps performed by the first mobile device 102 into a left dashed box and groups the steps that are performed by the second mobile device 104 into a right dashed box (additionally, steps 306, 310, 314 and 315 within those left and right dashed boxes also are shown to be dashed, indicating that those steps are optional and need not be performed in some circumstances or embodiments). As shown in FIGS. 4-7, during performance of the steps of FIG. 3, the first and second mobile devices 102, 104 are positioned adjacent to each other in a manner such that their central axes 138, 140 extend parallel (or substantially parallel) to one another and extend in a manner perpendicular (or substantially perpendicular) to a plane along which the two mobile devices are located, such as when both of the mobile devices are placed next to one another, face-up on a substantially flat surface such as a table or desktop (FIG. 1). In alternate embodiments, other absolute or relative orientations of the mobile devices can also be employed.

Figure 3:
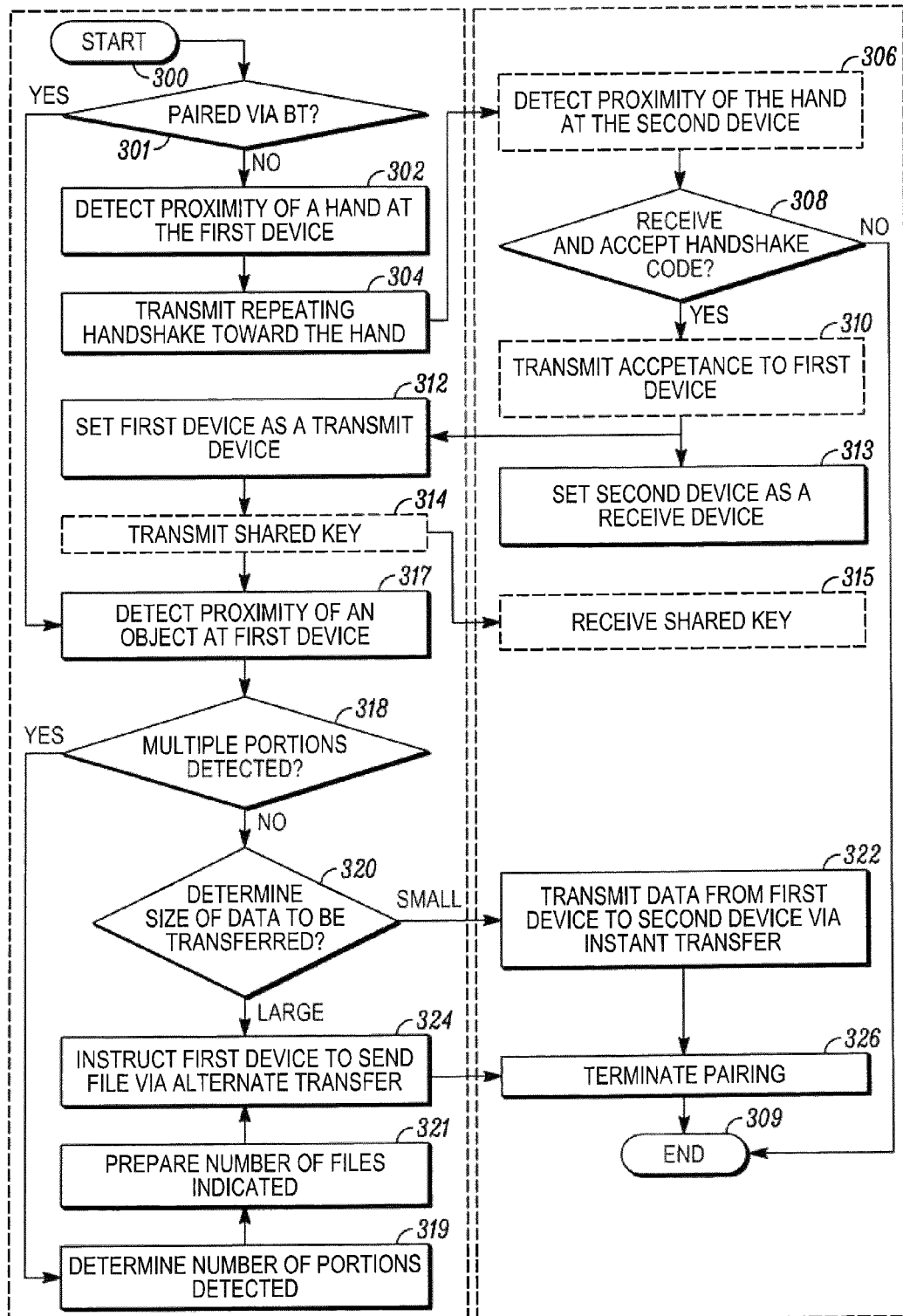
FIG. 3 is a flow chart illustrating exemplary steps of the mobile devices of FIG. 1 sensing an object, pairing, and at least initiating a transfer of data therebetween.

As shown in FIG. 3, after starting operation at a step 300, at a step 301, the mobile devices 102, 104 recognize if they are currently paired with one another by way of any existing communication linkage, such as a pre-established Bluetooth connection. If so, the process steps to step 317. However, assuming that the mobile devices 102, 104 are not already paired, then the process advances to a step 302. It should be noted that, in some alternate embodiments, the recognition step 301 is performed in a repeated or continual manner (e.g., in a manner in parallel with the performing of the other steps of the process of HG. 3) rather than merely at a particular time after the mobile devices have first been positioned adjacent to one another.

Figure 4:
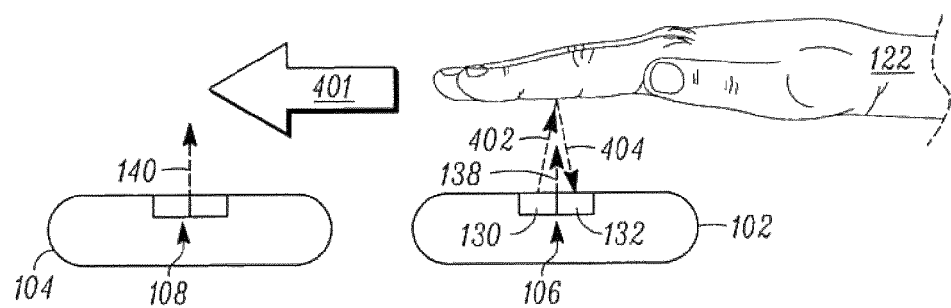
FIG. 4 is a side view of the mobile devices of FIG. 1 with an external object being swiped a first time over the devices, where the object is particularly shown to be over a first of the devices.

At the step 302, the sensing assembly 106 of the first mobile device 102 detects that an object such as the hand 122 is present above the sensing assembly as it is swiped over that assembly (e.g., so as to cross the central axis 138). As shown in FIG. 4, the sensing assembly 106 detects the presence of the hand 122 more particularly by transmitting an infrared proximity signal 402 from the phototransmitter 130 and, assuming that a portion of that transmitted infrared signal is reflected off of the hand 122, detecting a corresponding reflected signal 404 at the photodetector 132. If the reflected signal 404 that is detected has an amplitude that is greater than a predetermined threshold, then the processor of the first mobile device 102 concludes that the object (e.g., the hand 122) is present and in sufficient proximity to the first mobile device. In at least one embodiment, the presence of an object or object portion (or even a direction of movement of such object/object portion) can be detected in a similar manner by an ultrasound transceiver. Further as shown in FIG. 4, for the process represented by the step 302 and following steps to properly pair the mobile devices 102, 104, the swiping of the hand 122 should generally proceed across the first mobile device 102 in a direction toward the second mobile device 104 as indicated by an arrow 401. Preferably, the hand 122 is in an open position as it is swiped over the first mobile device 102, such that the palm of the hand (or otherwise larger surface of the hand) is available for the purpose of reflecting the infrared proximity signal 402 towards the photoreceiver 132; although in other embodiments, other surfaces of a hand (e.g., by one or more of the fingers 124) can provide sufficient reflection. Depending upon the width of the infrared beam being transmitted, the object need not always pass over the center axis 138 to satisfactorily receive and reflect the proximity signal 402, albeit it is often desirable for this to occur to enhance the likelihood that the object is detected.

Figure 5:
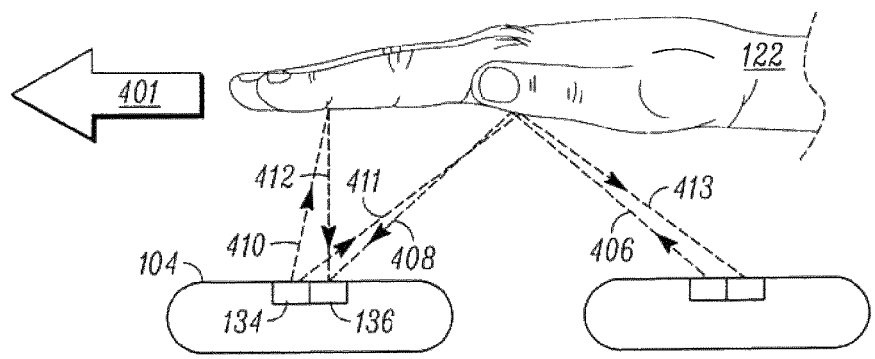
FIG. 5 is an additional side view of the exemplary mobile devices of FIG. 1 with an external object being swiped a first time over the devices, where the object is (in contrast to FIG. 4) particularly shown to be over both of the devices.

Next at a step 304, in response to the sensing of the hand swipe, the phototransmitter 130 of the first mobile device 102 begins to transmit an additional infrared signal 406 (as shown in FIG. 5) that is intended for receipt by the second mobile device 104. In at least one embodiment, the steps 302 and 304 can occur simultaneously, for example by using orthogonal coding of the infrared signal. The infrared signal 406 is particularly configured to allow for establishing a communication session between (e.g., the establishment of a communication link between or pairing of the mobile devices, including confirmations thereof) the mobile devices 102, 104 and in at least some embodiments can take the form of a handshake code (and/or a secret key, other coded signal, and/or other signal) that is known by the first and second mobile devices and is used to authenticate each device to the other. Typically the additional infrared signal 406 is transmitted repeatedly until pairing occurs. While this is occurring, as illustrated in FIG. 5, the swiping of the hand 122 continues such that the hand progresses toward and over the second mobile device 104, and thus the hand 122 moves into range of the second sensing assembly 108.

Also while this is occurring, the phototransmitter 134 of the second mobile device 104 is sending out an infrared proximity signal 410. When the hand 122 comes sufficiently close to the second mobile device 104, a portion of the signal 410 is reflected by the hand as a reflected proximity signal 412 that is received by the second photoreceiver 136 at step 306. If the reflected proximity signal 412 has an amplitude greater than a predetermined threshold, the processor of the second mobile device 104 interprets this as an indication that the hand 122 (or other object, as the case may be) is present and in sufficient proximity to the second mobile device. Upon detecting the presence of the hand 122, the second mobile device 104 becomes open to receiving a handshake code (and/or a secret key, other coded signal, and/or other signal) as transmitted by the first mobile device 102 in the transmitted signal 406. More particularly as shown in FIG. 5, due to the positioning of the hand 122, the additional infrared signal 406 emitted by the first mobile device 102 upon being reflected off of the hand 122 as a reflected signal 408 is directed toward the second mobile device. Then at step 308, the second mobile device 104 receives the handshake code (or other coded signal or other signal) in the reflected signal 408 that originated at the first mobile device 102. Although not shown or described with reference to FIG. 3, the detection of the hand 122 at the second mobile device 104 is not necessary in all embodiments. For example, in some other embodiments, the second mobile device 104 is already configured to receive a handshake code without sensing the hand 122 in proximity thereto. Thus, in one such embodiment employing the first and second mobile devices 102, 104, it is not necessary for the second mobile device 104 to send the signal 410 or receive the signal 412 prior to receiving the reflected signal 408, nor is it necessary for the step 306 to be performed by the second mobile device.

Next, at a step 308, assuming that the second mobile device 104 is ready and capable of receiving the handshake code (and/or secret key, other coded signal, or other signal) from the first mobile device 102, the second mobile device determines whether it has in fact received the handshake code from the first mobile device and additionally determines whether to accept the attempt to pair, as initiated by the transmission of the handshake code from the first mobile device. The decision whether to accept the attempt to pair can be preset (e.g., when the mobile device 104 is manufactured or upon launching of a software application) or specified by a user (e.g., selected or specified) in response to receiving a signal from the second mobile device that a determination needs to be made.

In at least some embodiments, to minimize the need for active user inputs, the acceptance of the handshake code is automatic, or at least automatic in the event one or more criteria are met. For example, in some embodiments, acceptance automatically occurs simply upon the second mobile device 104 receiving the handshake code. Also for example, in some embodiments, acceptance of the handshake code is automatic assuming that swiping or at least a particular manner of swiping has been detected, further for example, where the presence of the hand has been detected by one or both of the mobile devices within a specific time period. Such a time period for acceptance (or particular start and end times defining such a time period) can be encoded in the signal 406, 408 such that the second mobile device 104 will reject the handshake code if the difference between the time of receipt of the handshake code (e.g., the end time) and an earlier time (e.g., the start time) has exceeded the encoded time period. It should be noted that such automatic operation is in contrast to many conventional procedures for pairing mobile devices (e.g., Bluetooth devices). Among other things, such operation does not require a user to provide additional inputs for the purpose of allowing the different mobile devices to discover one another (e.g., a "discovery phase" of operation is absent or at least hidden from the user).

Additionally, such automatic acceptance procedures, which in at least some circumstances can be referred to as ad hoc pairing procedures, can provide added security over existing Bluetooth pairing schemes. This is because, rather than relying upon pre-discovery of the presence of a mobile device to govern whether pairing can be established (such that pairing occurs whenever previously-paired mobile devices merely come within range of one another), such ad hoc procedures instead allow pairing only when one or more specific criteria are met at or around the time/occasion for pairing, for example, only when a hand swipe occurs or occurs within a particular time period. When such ad hoc procedures are employed, users do not need to remember which devices were paired in the past via Bluetooth (to avoid inappropriate pairing with another mobile device). Rather, the users can be assured that pairing is initiated only between devices for which such pairing is intended, based upon the user's control over whether or when the one or more criteria (e.g., whether a swiping action has been taken) governing pairing have occurred. In some embodiments, in addition to exercising control over the initiation of pairing, a user can also (or instead) control the termination of pairing of mobile devices by taking an appropriate action or causing one or more criteria governing termination to be met.

If the second mobile device 104 rejects or is unable to receive the handshake code at the step 308, the process ends at a step 309 and no pairing of the mobile devices 102, 104 occurs. However, assuming that the second mobile device 104 does receive and accept the handshake code at the step 308, then the pairing process of FIG. 3 continues on to a step 310 at which the second mobile device's acceptance is communicated back to the first mobile device 102. Although the step 310 need not be performed in all embodiments, in the present embodiment the step 310 is performed and more particularly involves the sending of another infrared signal 411 (see FIG. 5) from the second mobile device 104 to the first mobile device 102 (as reflected by the hand 122 as a signal 413) to confirm that the handshake code has been accepted.

Next, at steps 312 and 313, after the second mobile device 104 has accepted the handshake code, the first mobile device 102 designates itself as a data-file-transmitting device and the second mobile device 104 designates itself as a data-file-receiving device. In some embodiments, the data-file-transmitting device can be considered a master and the data-file-receiving device can be considered a slave. Then at step 314, the first mobile device 102 transmits a shared key which allows each of the mobile devices 102, 104 to properly interpret further coded data transmissions received from the respective other one of the mobile devices (although in at least some alternate embodiments, a shared key is not utilized). In the present embodiment it is envisioned that the shared key is transmitted via infrared signals (as reflected off of the hand 122 or other object passing by the mobile devices 102, 104), since such transmission is typically short (e.g., 200 ms), albeit in other embodiments the shared key can be transmitted via a different communication link such as a Bluetooth communication link. After being transmitted, the shared key is received by the second mobile device 104, as represented by a step 315 (this step also need not be present depending upon the embodiment). At this point, the first hand swipe has successfully paired the first mobile device 102 to the second mobile device 104, and the first and second mobile devices 102, 104 are prepared to communicate further for the purpose of sending and receiving data.

Figure 6:
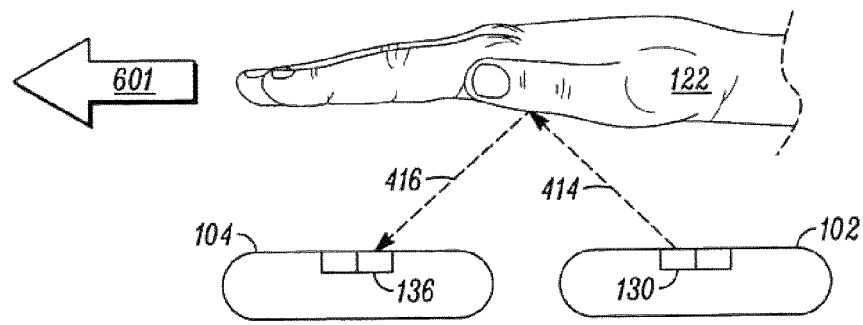
FIG. 6 is a side view of the exemplary mobile devices of FIG. 1 with an external object being swiped a second time over the devices.
Figure 7:
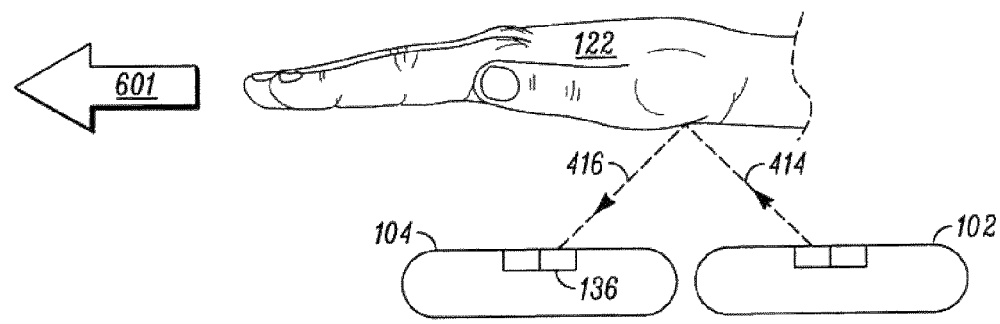
FIG. 7 is an additional side view of the exemplary mobile devices of FIG. 1 with an external object being swiped a second time over the devices, where the object is (in contrast to FIG. 6) particularly shown to be over a second of the devices.

Still referring to FIG. 3 and more particularly to FIGS. 6 and 7 subsequent to the pairing of those devices, additional communications can occur between the first and second mobile devices 102, 104 by way of additional infrared signals that are sent by the sensing assemblies 106, 108, reflected off of the hand 122, and then received by the sensing assemblies. Such additional communications allow for the transfer of data between the different mobile devices 102, 104, and are achieved upon the user performing a second swiping of the hand 122 across the mobile devices in the direction indicated by the arrow 601 (or possibly in any other direction, e.g., in the opposite direction). In the present embodiment, at a step 317, the first mobile device 102 detects an object (e.g., the hand 122, or one or more fingers) swipe in a manner similar to that of step 308 (and as discussed with reference to FIG. 4). Then at step 318, the first mobile device 102 senses whether a single object such as a hand is detected or if multiple object portions, such as fingers are detected. If only a single object is detected then the process continues at step 320, otherwise the process continues at step 319. At step 320, after detection of the second hand swipe at the first mobile device 102 has occurred, the first mobile device 102 evaluates the size of data (e.g., selected file(s)) to be transferred to the second mobile device 104. This evaluation can, for example, involve a comparison of the size of the data with a preset limit. Typically only a limited amount of data can be transmitted by way of infrared signals reflected off of the hand 122 as it is swiped over the two mobile devices 102, 104 (e.g., 5 KB).

If the size of the data is determined to be sufficiently small at the step 320, then at a step 322 the data is transferred from the first mobile device 102 to the second mobile device 104 during the second hand swipe, as shown in FIG. 6. Referring to FIG. 6, the hand 122 is shown in an intermediate position after the first mobile device 102 has detected its presence and therefore been instructed to conduct a transfer of data. The first mobile device 102 is shown sending infrared data signals 414 from the first phototransmitter 130 that are reflected by the hand 122 as reflected data signals 416 and then received at the second photoreceiver 136. As shown further in FIG. 7, the hand 122 then continues over the second mobile device 104 as the swipe and the transmission are completed. Such transmission of the data via infrared signals reflected off of the hand 122 (or other swiped object) can be referred to as an "instant transfer".

Alternatively, if the size of the data to be transferred between the mobile devices 102, 104 is determined at the step 320 as being too large for transmission during the hand swipe, then a request to transfer using an alternate transfer mechanism (e.g., any one or more of various other communication techniques available to the mobile devices 102, 104, for example, a cellular network, WiFi, Bluetooth, etc.) is initiated at a step 324, (during the hand swipe) to perform the data transfer (although the data transfer can take place at a later time/date based on device activity). In at least some cases when this occurs, additional infrared data signal(s) can still be passed between the mobile devices 102, 104 to achieve coordination between those devices in communicating the data via such alternate transfer mechanism. Additionally, in some further embodiments, a data file itself can be encoded with a level of security that prescribes whether the file is to be transferred via instant transfer or alternate transfer regardless of the file size. For example, when transferring financial data, personal data, or other sensitive data, it can be preferred to allow only an instant transfer, which substantially limits the range and potential access by an unwanted recipient.

Although FIG. 3 specifically provides two alternatives in the form of the steps 322 and 324 in terms of how data is transferred following the step 320 depending upon the amount of data to be transferred, various other transfer options can also be available in alternate embodiments. For example, if the data to be transferred includes files of both small and large sizes (or otherwise can be broken into subportions of data), then some of the data can be transferred via infrared signals (that is, via the instant transfer mechanism described above involving swiping of the hand), while other data is transferred using an alternate mechanism. Also for example, in some situations where a single swiping of the hand is insufficient to allow for infrared transmission of the data, multiple swipings of the hand (or simply a holding of the hand in place between the devices) can still be sufficient to allow for transmission. If this is the case, then an indication of that possibility can be provided to the user (e.g., by the mobile device from which data is to be transferred), and in response the user can then take an appropriate action allowing for the complete data transfer to take place such as, for example, repeatedly swiping over the mobile devices or holding an object stationary above the mobile devices for a period of time. It should also be noted that, while transfer of data using infrared signals can be performed immediately when a swiping movement occurs, the starting of data transfer by way of an alternate transfer mechanism can be delayed until a later time if desired.

In at least one embodiment the file to be transferred between devices can be selected in numerous ways, for example, if the mobile device is playing a song when the hand swipe takes place, that song file is automatically selected as the file to transfer. If the mobile device is viewing a photo, that photo is automatically selected for transfer. In addition a user can bring the file to the screen or highlight one or more files displayed on the screen and they will be automatically selected for transfer. The use of multiple hand swipes can provide for multiple file transfers without re-establishing communications between the mobile devices. In one embodiment a first hand swipe would pair the mobile devices, a second hand swipe would transfer the selected file, and a third swipe could transfer the other files available that were not selected but are displayed or otherwise associated with the first file transferred. In addition, one or more of the hand swipes across either device can initiate a file transfer from either device to the other device.

Referring back to FIG. 3, after the data transfer is complete, either by way of infrared signals transmitted at the time of swiping allowing for instant transfer according to the step 322 or by way of an alternate transfer mechanism in the step 324 (or by way of both mechanisms or in some other manner), then the process terminates the pairing at a step 326, at which the communication link between the mobile devices 102, 104 is terminated. The termination of the communication link (that is, the termination of the communication session, or termination of the pairing of the mobile devices 102, 104) occurs immediately upon conclusion of instant file transfer or alternative file transfer order. In at least some embodiments, the termination of the communication link can occur at a pre-set time following the completion of the data transfer. Further for example, in some embodiments, pairing is terminated after a short file is transferred (or after large file transfer is enabled to happen at a later time).

In addition, although automatic termination of the communication link after a period of time can be desirable to prevent communication linkages from continuing in an indefinite manner, in other embodiments termination of the communication link does not occur until another event occurs (e.g., until the mobile devices are physically moved to a sufficient degree as determined using an accelerometer, or moved apart to a sufficient degree that a Bluetooth or other connection is disrupted). Further, the file itself can include a security setting that prescribes the timing of termination of the communication link. It should be noted that, although the hand 122 has been referred to above as the object for swiping across the mobile devices 102, 104, other objects or portions of objects capable of reflecting infrared signals can be used as well (e.g., another part of the human body such as a person's arm, a card, etc.). In this regard, in at least some embodiments, one or more of the above actions, and/or other actions, can be effectuated not only by the use of the hand 122 but also or instead through the use of one or more of the fingers 124.

Figure 8:
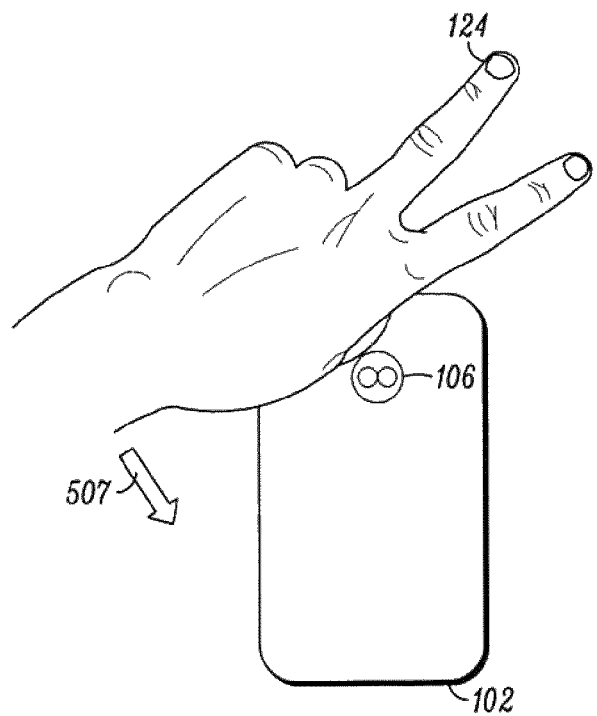
FIG. 8 depicts an exemplary object with two object portions being passed over a mobile device such as one of the mobile devices shown in FIG. 1.
Figure 9:
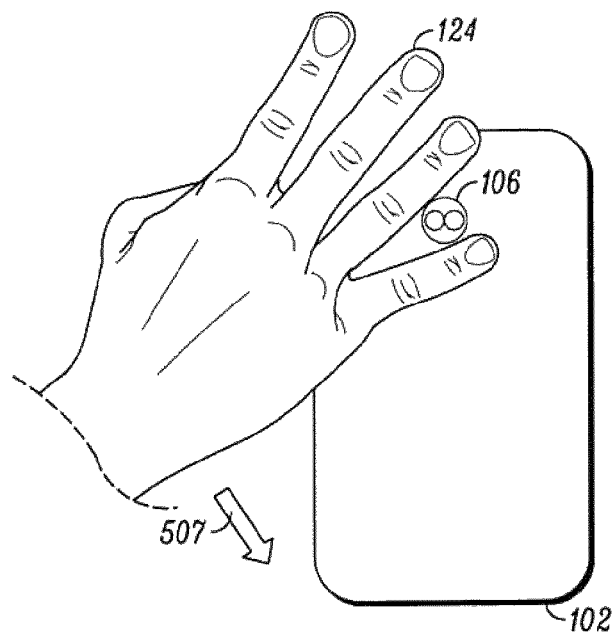
FIG. 9 depicts an exemplary object with four object portions being passed over a mobile device such as one of the mobile devices shown in FIG. 1.

Turning to FIGS. 8 and 9, the first mobile device 102 is shown with the fingers 124 being swiped over it in two different exemplary scenarios. FIG. 8 in particular shows two of the fingers 124 being swiped over the sensing assembly 106 of the first mobile device (along a direction indicated by an arrow 507), while FIG. 9 shows four of the fingers 124 being swiped over that sensing assembly (again in the same direction). Upon sensing the swiping of the fingers 124 either as shown in FIG. 8 or FIG. 9, a variety of different operations can be initiated either specifically in the first mobile device 102 or that mobile device in combination with the second mobile device 104. To the extent that the swiping of the fingers 124 is intended to initiate data communications between the first and second mobile devices 102, 104, it should be understood that such operation typically will proceed only when the fingers 124 are swiped not only across the first mobile device 102 as shown in FIGS. 8 and 9 but also then toward and over the second mobile device 104 in a manner similar to that shown in FIG. 1 (but not in FIGS. 8-9). It should be noted that, typically, for multiple smaller object portions such as the fingers 124 to be individually detected, the swiping of those object portions/fingers should bring those object portions/fingers in relatively close proximity to the sensing assembly 106 for better resolution of the reflected signals.

Referring as well to the flow chart of FIG. 3, as discussed above, if multiple object portions are detected, then the process moves from step 318 to step 319. As shown, at the step 319 not only are the fingers 124 sensed as the fingers are successively passed over the first sensing assembly 106, but also the particular number of fingers passed over the sensing assembly is detected. That is, each individual one of the fingers 124 is detected as it passes over the first sensing assembly 106. This can be achieved because each finger 124 intercepts the infrared proximity signal and reflects it once, thereby creating a pulse that is counted by the mobile device 102. Insofar as the number of fingers 124 passing over the first sensing assembly 106 can be detected, it is possible for the mobile device 102 to interpret not only the passing of the fingers over the mobile device collectively as an instruction but also to interpret the particular number of fingers passing over the mobile device as having a particular meaning.

For example, the number of pulses detected corresponding to the number of fingers 124 passing over the first mobile device 102 can be interpreted by that mobile device as representing the quantity of files that are to be transferred by the first mobile device to the second mobile device 104 (e.g., the sensing of two fingers as in FIG. 8 would signify that two files should be transferred, while the sensing of four fingers as in FIG. 9 would signify that four files should be transferred). After the quantity of files to be transferred has been established by the first mobile device 102 based upon the sensing of the fingers 124, the files to be transferred from the first mobile device to the second mobile device 104 are then prepared in step 321 and then the first mobile device is instructed to transfer the files via an alternate transfer mechanism, as discussed in step 324. Although the flow chart of FIG. 3 shows the process proceeding from the step 321 directly to the step 324, in alternate embodiments it is still possible that all or a portion of the data to be transferred will be sent by way of an instant transfer mechanism (e.g., as represented by the step 322) rather than an alternate transfer mechanism based on file size or other criteria, such as security settings.

Also, the first mobile device 102 (or collectively both mobile devices 102, 104) can be configured in other embodiments to activate one or more functions based on the number of pulses detected. These functions can include, for example, menu shortcuts, speed-dialing, etc. Further, the number of pulses can recognized as an indication for the preferred method of data transfer, namely by an instant or alternate transfer method. Additionally, the number of pulses (corresponding again for example to the number of fingers passing by) can be used to set a level of pairing security (e.g., pairing/swiping with two fingers enables encryption while one finger does not enable encryption). Further, in at least some embodiments, the first mobile device 102 (or other mobile device) interprets multiple successive pulses or other signal variations as being indicative of multiple related object portions that should be recognized as being part of the same object or otherwise related (e.g., fingers of the same hand) particularly when the multiple successive pulses or other signal variations are sensed by the first mobile device as occurring within a preset time period. In some such embodiments, if the multiple pulses or other signal variations do not occur within the preset time period, then the first mobile device 102 does not ascribe any particular meaning based upon the number of those pulses or signal variations.

As discussed above, infrared signals can be used both for detecting the proximity of the hand 122 (or the fingers 124 or other objects or object portions), as well as for communicating information that allows both for pairing of the mobile devices 102, 104 (e.g., the handshake codes) as well as other data that is to be transferred between the mobile devices. When sending and receiving these types of infrared signals, interference can prohibit the accurate interpretation of the signals. To prevent or limit interference between these signals, and to otherwise facilitate communications between the mobile devices in a manner that is more secure, in at least some embodiments coding is used to combat interference, to provide noise suppression, and/or to enhance security. More particularly, in some such embodiments, an orthogonal code is used, such as a Hadamard code.

The use of an orthogonal code in particular can benefit several areas. First, to the extent that such an orthogonal code is used, two different signals can be sent/received at the same time without interference so long as the two signals are orthogonal relative to one another. For example, in at least one such embodiment, the infrared signals used for detecting the presence/proximity of the hand 122 and/or achieving pairing between the mobile devices 102, 104 (e.g., as used in relation to the steps 308-317 of FIG. 3) can be orthogonal relative to any infrared signals used for communicating data between the mobile devices that are paired (e.g., as used in the step 322). In an exemplary embodiment, a first hand swipe can pair the first and second mobile devices 102, 104, a second hand swipe can transfer a file from the first device 102 to the second device 104, and a third hand swipe can transfer a file from the second device 104 to the first device 102. In an alternate embodiment, the file transfers can occur simultaneously using the orthogonal coding, providing a more efficient, faster data transfer process. Also, in addition to providing noise suppression, orthogonal coding can also provide each of the mobile devices 102, 104 with a unique signature code that is capable of enhancing a desired signal, Further, the mobile devices 102, 104 can be configured to scan for only specific codes, with the orthogonal code allowing for concurrent signal processing for both desired and undesired codes. This scanning can be used to detect and identify the presence of other mobile devices that are nearby. Additionally, an orthogonal code such as a Hadamard code having a length sufficient for noise suppression also has the benefit of uniqueness for detecting numerous peer to peer, originating and terminating, and/or sending and receiving devices. Pairing between mobile devices is possible with many users as the length of a Hadamard code set is extended (2, 4, 8, 16, 32, etc.). A typical Hadamard code depth choice for an RF application, such as described herein, is between 16 and 256, where a code depth of 16 has a 12 dB processing gain, thereby providing a radially expandable link. Thus, the use of Hadamard coding makes it possible to achieve communications at any given time not merely between a single pair of mobile devices, but between multiple pairs of mobile devices, and not merely between a single mobile device and only one other mobile device, but also between the single mobile device and numerous other mobile devices.

Notwithstanding the above description, other types of sensing mechanisms instead of (or in addition to) infrared sensing mechanisms can also or instead be employed in other embodiments such as ultrasound and visible light sensor. The visible light sensor (not shown) can be included on the mobile device 102. Using such a sensor, the fingers 124 can again be passed over the light sensor to create pulses (as discussed above), with the number of pulses representing the number of fingers 124 passing over the light sensor, similar to the method discussed above with regard to the first sensing assembly 106. Finally, notwithstanding the general description above of how the mobile devices are paired and information is transferred, it will be understood that other additional or different processing steps can also be employed to pair the mobile devices and transfer data. For example, in at least some embodiments, both the sensing of the presence of a hand, subsequent pairing of mobile devices, and further communication of data between the paired mobile devices can be achieved through only a single swipe of the hand rather than multiple swipes. Further, while in some embodiments infrared signals are employed not only to allow for detection of object(s) passing by the mobile device(s), but also to allow for the communication of signals used to establish pairing as well as data signals once such pairing is established, in other embodiments other types of communication links can be used for one or more of these operations in addition to, or instead of, infrared signals. For example, in some other embodiments, Bluetooth communication link(s) are used for the communication of signals used to establish pairing and/or signals allowing for file transfer or other data transfer.

At the same time, it will be appreciated the embodiments of the present invention allow for achieving communications between mobile devices in a simple, effective manner that can also be performed in a secure manner with minimal interference. Indeed, by allowing two mobile devices to be paired simply by the swiping/waving of a hand across the two devices, a user can achieve desired pairing without any need to fumble with pressing small buttons on one or both of the devices or taking other actions that are perhaps inconvenient, cumbersome, or not ergonomic. At the same time, by achieving pairing in this manner, a user can have confidence that the mobile devices that the user desires to be paired have in fact been paired with one another rather than other mobile devices, which might otherwise occur if pairing was a merely automatic (or substantially automatic) function performed by the mobile devices themselves. In addition, by further allowing for communications in at least some circumstances by way of signals bounced off of the user's own hand as it is swiped across the two mobile devices, the communication of data can be achieved without the need for other communications mechanisms. Indeed, by allowing for both pairing of mobile devices and data transmission by way of the same swiping movement of a hand (or other fingers or other objects or object portions), pairing and data communications can be achieved by a users in an intuitive, simple, and ergonomic manner.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method of achieving communications between first and second mobile devices that are in proximity with one another, the method comprising:
   (a) transmitting a first signal from the first mobile device;
   (b) receiving a first reflected signal at the first mobile device, the first reflected signal being the first signal reflected by an object in proximity to the first mobile device;
   (c) based upon receipt of the first reflected signal, transmitting a second signal from the first mobile device for receipt by the second mobile device upon being reflected by the object;
   (d) receiving a confirmation signal from the second mobile device in response to the second signal;
   (e) achieving a paired relationship of the first mobile device relative to the second mobile device, whereby because of the paired relationship the first and second mobile devices are capable of additional communications therebetween, and (f) transmitting a third signal from the first mobile device for receipt by the second mobile device upon being reflected by the object, wherein the third signal is representative of data that is to be communicated from the first mobile device to the second mobile device, wherein reflections of the first and second signals associated with (b) and (c) occur off of the object as the object is passing by the first and second mobile devices a first time, wherein a reflection of the third signal associated with (f) occurs off of the object as the object is passing by the first and second mobile devices a second time, and wherein each of the first, second, and third transmitted signals is an infrared signal.

2. The method of claim 1, further comprising:
determining a data file transfer path for sending one or more data files from the first mobile device based on at least one of data file size and an encoded instruction, wherein the third signal is in accordance with the determined data file transfer path and the data includes at least one of the one or more data files.

3. The method of claim 1, wherein at least one of the first, second, and third signals is modulated in accordance with an orthogonal code.

4. The method of claim 3, wherein the orthogonal code is a Hadamard code, and wherein the first mobile device is selected from a group consisting of: a personal digital assistant, a cellular telephone, a smart phone, and a computer.

5. The method of claim 3, wherein at least one of the first and second signals is coded in a first manner that is orthogonal relative to a second manner of coding of the third signal.

6. The method of claim 1, wherein the first mobile device is capable of detecting a number of object portions of the object within a set time interval, based upon at least one characteristic of at least one of the first reflected signal and one or more additional reflected signals.

7. The method of claim 6, wherein the number of object portions detected is intended to convey at least one of: a number of data files to be transferred, and a level of security encryption for data file transfer.

8. The method of claim 1, further comprising: subsequent to (d), transferring additional data between the first and second mobile devices using a radio access technology.

9. The method of claim 1, wherein the second signal includes a handshake code.

10. The method of claim 1, wherein the second signal includes a shared key.

11. The method of claim 1, further comprising: subsequent to (d), transferring additional data from the first mobile device using at least one of WiFi, Bluetooth, or a cellular network.

12. A first mobile device for achieving communications with a second mobile device that is in proximity with the first mobile device, the first mobile device comprising:
an infrared transmitter capable of transmitting first and second signals from the first mobile device;
an infrared receiver capable of receiving a first reflected signal, the first reflected signal being the first signal reflected by an object; and
a processor coupled to the infrared transmitter and the infrared receiver and configured to determine, based upon the first reflected signal, if the object is in proximity to the first mobile device,
wherein the processor causes the infrared transmitter to transmit a second signal upon determining that the object is present in proximity to the first mobile device and wherein the second signal is configured to enable a paired relationship to be established between the first and second mobile devices via reflection off the object,
whereby, because of the paired relationship, the first and second mobile devices are capable of additional communications therebetween, and
wherein an additional signal transmitted under the control of the processor, the additional signal being transmitted either by the infrared transmitter for reflections by the object and receipt by the second mobile device, or by another transmitter for receipt by the second mobile dvice, wherein the additional signal includes data to be transferred from the first mobile device to the second mobile device.

13. The first mobile device of claim 12, wherein the additional signal is a third infrared signal, wherein the third infrared signal is coded in a manner that is orthogonal to at least one of the first and second signals.

14. The first mobile device of claim 12, wherein the infrared transmitter and the infrared receiver are within a pyramid-type sensing assembly of the first mobile device, wherein the pyramid-type sensing assembly has a plurality of photodiodes, and wherein based upon information provided from the pyramid-type sensing assembly, the first mobile device is capable of detecting directional movement of the object as the object passes by the first mobile device.

15. The first mobile device of claim 12, wherein, the first mobile device is selected from a group consisting of: personal digital assistant, cellular telephone, smart phone, portable computer, portable video player, portable audio player, geopositioning device, navigation device, gaming console, television, kiosk, automated teller machine, vending machine, and automobile.

16. A second mobile device for achieving communications with a first mobile device that is in proximity with the second mobile device, the second mobile device comprising:
an infrared transmitter capable of sending first and second signals from the second mobile device;
an infrared receiver capable of receiving a first reflected signal, the first reflected signal being the first signal reflected by an object; and
a processor coupled to the infrared transmitter and the infrared receiver and configured to determine, based upon the first reflected signal, if the object is in proximity to the second mobile device,
wherein the infrared receiver is enabled to receive an additional signal originating from the first mobile device upon determining that the object is present in proximity to the second mobile device and
wherein the processor, upon receiving the additional signal, causes the infrared transmitter to transmit the second signal for receipt by the first mobile device via reflection by the object passing the second mobile device, the second signal confirming an acceptance by the second mobile device of a pairing offer represented by the additional signal,
whereby a paired relationship between the second and first mobile devices is established and, because of the paired relationship, the first and second mobile devices are capable of additional communications therebetween.

17. The second mobile device of claim 16, wherein a shared key is required for the additional communications, and at least one of the additional signal and a further signal received by the second mobile device includes the shared key.

* * * * *